(12) United States Patent
Zhong et al.

(10) Patent No.: US 12,124,457 B2
(45) Date of Patent: *Oct. 22, 2024

(54) TRIGGERING LOCAL EXTENSIONS BASED ON INFERRED INTENT

(71) Applicant: Google LLC, Mountain View, CA (US)

(72) Inventors: Qian Zhong, San Jose, CA (US); Claire McLeod, Sunnyvale, CA (US); Yebin Tao, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/846,795

(22) Filed: Jun. 22, 2022

(65) Prior Publication Data

US 2022/0327130 A1   Oct. 13, 2022

Related U.S. Application Data

(63) Continuation of application No. 16/669,030, filed on Oct. 30, 2019, now Pat. No. 11,397,737, which is a
(Continued)

(51) Int. Cl.
*G06F 16/242* (2019.01)
*G06F 16/2455* (2019.01)
(Continued)

(52) U.S. Cl.
CPC .... *G06F 16/24565* (2019.01); *G06F 16/2428* (2019.01); *G06F 16/24575* (2019.01);
(Continued)

(58) Field of Classification Search
CPC .......... G06F 16/24565; G06F 16/2428; G06F 16/24575; G06F 16/2471; G06F 16/248;
(Continued)

(56) References Cited

U.S. PATENT DOCUMENTS 7,860,886 B2   12/2010 Loftesness
9,025,888 B1   5/2015 Jing et al.
(Continued)

FOREIGN PATENT DOCUMENTS

CN   102117321   7/2011
CN   102449625   5/2012
(Continued)

OTHER PUBLICATIONS

Office Action in European Appln. No. 19725476.6, mailed on Jun. 12, 2023, 9 pages.
(Continued)

*Primary Examiner* — Jorge A Casanova
(74) *Attorney, Agent, or Firm* — Fish & Richardson P.C.

(57) ABSTRACT

Methods, systems, and apparatus, including computer programs encoded on a computer storage medium, for obtaining cluster data, determining a portion of the search queries within the given query cluster that trigger a local search feature, assigning to the intent flag a value indicating that the given cluster is high local intent cluster when the portion of the search queries within the given query cluster that trigger the local search feature meets the local intent threshold, assigning to the intent flag a value indicating that the given cluster is a low local intent cluster when the portion of the search queries within the given query cluster that trigger the local search feature fails to meet the local intent threshold, and modifying a content item including adding a local content feature to the content item when the search query is determined to be included in the high local intent cluster.

20 Claims, 8 Drawing Sheets

Related U.S. Application Data continuation of application No. PCT/US2019/030866, filed on May 6, 2019.

(51) Int. Cl.
| | |
|---|---|
| *G06F 16/2457* | (2019.01) |
| *G06F 16/2458* | (2019.01) |
| *G06F 16/248* | (2019.01) |
| *G06F 16/25* | (2019.01) |
| *G06F 16/28* | (2019.01) |
| *G06N 5/04* | (2023.01) |

(52) U.S. Cl.
CPC ........ *G06F 16/2471* (2019.01); *G06F 16/248* (2019.01); *G06F 16/252* (2019.01); *G06F 16/285* (2019.01); *G06N 5/04* (2013.01)

(58) Field of Classification Search
CPC .. G06F 16/252; G06F 16/285; G06F 16/9537; G06F 16/90324; G06F 16/90332; G06F 16/90335; G06F 16/909; G06N 5/04
See application file for complete search history.

(56) References Cited

U.S. PATENT DOCUMENTS

| | | | |
|---|---|---|---|
| 10,134,055 | B2 | 11/2018 | Santi et al. |
| 2006/0085392 | A1 | 4/2006 | Wang et al. |
| 2007/0100801 | A1 | 5/2007 | Celik et al. |
| 2008/0222119 | A1 | 9/2008 | Dai et al. |
| 2009/0043749 | A1 | 2/2009 | Garg et al. |
| 2009/0077047 | A1 | 3/2009 | Cooper et al. |
| 2011/0184981 | A1 | 7/2011 | Lu et al. |
| 2011/0208715 | A1 | 8/2011 | Ni et al. |
| 2012/0059838 | A1 | 3/2012 | Berntson et al. |
| 2015/0169771 | A1 | 6/2015 | Staddon et al. |
| 2015/0193447 | A1 | 7/2015 | Voinea et al. |
| 2015/0278355 | A1 | 10/2015 | Hassanpour et al. |
| 2016/0034951 | A1 | 2/2016 | Celis et al. |
| 2016/0261541 | A1 | 9/2016 | Samuni et al. |
| 2016/0352743 | A1 | 12/2016 | VerWeyst et al. |
| 2017/0147710 | A1 | 5/2017 | Lai et al. |
| 2017/0220573 | A1 | 8/2017 | McMichael |

FOREIGN PATENT DOCUMENTS

| | | |
|---|---|---|
| CN | 106844680 | 6/2017 |
| CN | 108139849 | 6/2018 |
| CN | 108140055 | 6/2018 |
| CN | 108475320 | 8/2018 |
| EP | 1643391 | 4/2006 |
| JP | 2017-525026 | 8/2017 |
| WO | WO 2015/102846 | 7/2015 |
| WO | WO 2015/195839 | 12/2015 |

OTHER PUBLICATIONS

Office Action in Japanese Appln. No. 2020-550138, dated Aug. 8, 2022, 4 pages (with English translation).
Notice of Allowance in Japanese Appln. No. 2020-550138, dated Jan. 23, 2023, 5 pages (with English translation).
Gasparetti, "Personalization and Context-awareness in Social Local Search: State-of-the-art and Future Research Challenges" Pervasive and Mobile Computing, Apr. 28, 2016, 83 pages.
Linxu Li, "Characteristic Analysis and Visualization Based on User Big Data" Master's degree thesis in Electronics and Communication Engineering, China School Information Communication Engineering, Mar. 2018, 90 pages (with English abstract).
Notice of Allowance in Chinese Appln. No. 201980020444.2, mailed on Feb. 21, 2024, 7 pages (with English translation).
Office Action in Chinese Appln. No. 201980020444.2, mailed on Nov. 27, 2023, 16 pages (with English translation).
Extended European Search Report in European Appln. No. 24159505.7, mailed on Jun. 12, 2024, 7 pages.

TRIGGERING LOCAL EXTENSIONS BASED ON INFERRED INTENT

CROSS-REFERENCE TO RELATED APPLICATION

This application is a continuation application of, and claims priority to, U.S. patent application Ser. No. 16/669,030, filed on Oct. 30, 2019, which is a continuation of PCT Application No. PCT/US2019/030866, filed May 6, 2019. The contents of each are herein incorporated by reference.

BACKGROUND

The Internet provides access to a wide variety of electronic documents, such as image files, audio files, video files, and webpages. A search system can identify electronic documents that are responsive to search queries. The search queries can include one or more search terms, images, audio data, or a combination thereof.

Digital content systems can provide to a user content in response to particular search queries. Periodically a digital content provider may desire the capability of providing adjusted content to a user, when the user's search query contains location intent.

SUMMARY

This specification describes technologies relating to modifying the distribution of content to a user based on a determined local intent of a submitted search query provided by a same content provider.

In general, one innovative aspect of the subject matter described in this specification can be embodied in methods that include obtaining, by one or more computers, cluster data including a plurality of query clusters, wherein each query cluster is a set of search queries that have been included in a same query cluster based on one or more matching query features. For each given query cluster from among the plurality of query clusters, determining, by the one or more computers, a portion of the search queries within the given query cluster that trigger a local search feature when input to a search system, determining whether the portion of the search queries within the given query cluster that trigger a local search feature meets a local intent threshold, maintaining, in a memory accessible to the one or more computers, an intent flag for the given query cluster based on the determination of whether the portion of the search queries within the given query cluster that trigger the local search feature meets the local intent threshold, including assigning to the intent flag, by the one or more computers, a value indicating that the given cluster is high local intent cluster when the portion of the search queries within the given query cluster that trigger the local search feature meets the local intent threshold, and assigning to the intent flag, by the one or more computers, a value indicating that the given cluster is a low local intent cluster when the portion of the search queries within the given query cluster that trigger the local search feature fails to meet the local intent threshold. The method further includes receiving, by the one or more computers, a search query submitted by a client device and an indication of one of the plurality of clusters in which the search query is included, accessing, by the one or more computers, the intent flag associated with the one of the plurality of clusters to determine whether the search query is included in the high local intent cluster or the low local intent cluster, and responding to the search query, including modifying, by the one or more computers, a content item distributed to the client device in response to the search query, including adding a local content feature to the content item when the search query is determined to be included in the high local intent cluster, and distributing, by the one or more computers, the content item distributed to the client device in response to the search query without adding the local content feature when the search query is determined to be included in the low local intent cluster.

These and other embodiments can each optionally include one or more of the following features.

In some examples, determining a portion of the search queries within the given query cluster that trigger a local search feature when input to a search system includes for each given search query within the given query cluster, determining whether the given query triggers presentation of a local knowledge panel in a search results page generated by the search system using the given search query, determining a total number of the given search queries that trigger presentation of the local knowledge panel, and determining the portion of the search queries based on a ratio of the total number of the given search queries that trigger presentation of the local knowledge panel relative to how many search queries are in the given query cluster.

In some examples, determining a portion of the search queries within the given query cluster that trigger a local search feature when input to a search system includes for each given search query within the given query cluster, determining whether the given query includes local attributes that triggers presentation of one or more local elements in a search results page generated by the search system using the given search query, determining a total number of the given search queries that trigger presentation of one or more local elements, and determining the portion of the search queries based on a ratio of the total number of the given search queries that trigger presentation of one or more local elements relative to how many search queries are in the given query cluster.

In some examples, determining whether the search query is included in the high local intent cluster or the low local intent cluster includes searching multiple different query clusters using the search query, determining whether a given query cluster that is determined to include the search query based on the search has been assigned a value to the intent flag indicating as a high local intent cluster or a low local intent cluster, and assigning to the intent flag a value indicating that the search query is a high local intent query or a low local intent query based on the determined assigned value to the intent flag of the given query cluster that includes the search query.

In some examples, determining whether the search query is included in the high local intent cluster or the low local intent cluster includes identifying the search query in a database of search queries, determining whether a high local intent flag or a low local intent flag has been set for the search query in the database, and assigning to the intent flag a value indicating that the search query is a high local intent query or a low local intent query based on the determination of whether the high local intent flag or the low local intent flag has been set for the search query in the database.

In some examples, the added local content feature of the modified content item includes an interactive user interface object, and the method further includes receiving information specifying an interaction with the interactive user interface object, and providing data that causes additional content to be presented, the additional content being selected based on the interaction.

In some examples, adding the local content feature to the content item when the search query is determined to be included in the high local intent cluster includes adding the local content feature as a graphic overlay on the content item.

Other embodiments of this aspect can include corresponding systems, apparatus, and computer programs, configured to perform the actions of the methods, encoded on computer storage devices.

In general, another innovative aspect of the subject matter described in this specification can be embodied in a system that includes a data processing apparatus, and a non-transitory computer readable storage medium in data communication with the data processing apparatus and storing instructions executable by the data processing apparatus and upon such execution cause the data processing apparatus to perform operations. The operations include obtaining, by one or more computers, cluster data including a plurality of query clusters, wherein each query cluster is a set of search queries that have been included in a same query cluster based on one or more matching query features. For each given query cluster from among the plurality of query clusters, the operations further include determining, by the one or more computers, a portion of the search queries within the given query cluster that trigger a local search feature when input to a search system, determining whether the portion of the search queries within the given query cluster that trigger a local search feature meets a local intent threshold, maintaining, in a memory accessible to the one or more computers, an intent flag for the given query cluster based on the determination of whether the portion of the search queries within the given query cluster that trigger the local search feature meets the local intent threshold, including assigning to the intent flag, by the one or more computers, a value indicating that the given cluster is high local intent cluster when the portion of the search queries within the given query cluster that trigger the local search feature meets the local intent threshold, and assigning to the intent flag, by the one or more computers, a value indicating that the given cluster is a low local intent cluster when the portion of the search queries within the given query cluster that trigger the local search feature fails to meet the local intent threshold. The operations further include receiving, by the one or more computers, a search query submitted by a client device and an indication of one of the plurality of clusters in which the search query is included, accessing, by the one or more computers, the intent flag associated with the one of the plurality of clusters to determine whether the search query is included in the high local intent cluster or the low local intent cluster, and responding to the search query, including modifying, by the one or more computers, a content item distributed to the client device in response to the search query, including adding a local content feature to the content item when the search query is determined to be included in the high local intent cluster, and distributing, by the one or more computers, the content item distributed to the client device in response to the search query without adding the local content feature when the search query is determined to be included in the low local intent cluster.

In general, another innovative aspect of the subject matter described in this specification can be embodied in a non-transitory computer storage medium encoded with a computer program, the computer program including instructions that when executed by a data processing apparatus cause the data processing apparatus to perform operations. The operations include obtaining, by one or more computers, cluster data including a plurality of query clusters, wherein each query cluster is a set of search queries that have been included in a same query cluster based on one or more matching query features. For each given query cluster from among the plurality of query clusters, the operations further include determining, by the one or more computers, a portion of the search queries within the given query cluster that trigger a local search feature when input to a search system, determining whether the portion of the search queries within the given query cluster that trigger a local search feature meets a local intent threshold, maintaining, in a memory accessible to the one or more computers, an intent flag for the given query cluster based on the determination of whether the portion of the search queries within the given query cluster that trigger the local search feature meets the local intent threshold, including assigning to the intent flag, by the one or more computers, a value indicating that the given cluster is high local intent cluster when the portion of the search queries within the given query cluster that trigger the local search feature meets the local intent threshold, and assigning to the intent flag, by the one or more computers, a value indicating that the given cluster is a low local intent cluster when the portion of the search queries within the given query cluster that trigger the local search feature fails to meet the local intent threshold. The operations further include receiving, by the one or more computers, a search query submitted by a client device and an indication of one of the plurality of clusters in which the search query is included, accessing, by the one or more computers, the intent flag associated with the one of the plurality of clusters to determine whether the search query is included in the high local intent cluster or the low local intent cluster, and responding to the search query, including modifying, by the one or more computers, a content item distributed to the client device in response to the search query, including adding a local content feature to the content item when the search query is determined to be included in the high local intent cluster, and distributing, by the one or more computers, the content item distributed to the client device in response to the search query without adding the local content feature when the search query is determined to be included in the low local intent cluster.

Particular embodiments of the subject matter described in this specification can be implemented so as to realize one or more of the following advantages. The techniques discussed herein enable a computer system to infer intent of queries, where that intent is not directly expressed, and then utilize that intent to trigger extensions (e.g., features that are only triggered and/or presented upon the occurrence of certain conditions). This ability to infer intent, and modify actions taken by a system based on intents that are not directly observable from user input itself (e.g., a search query) enables the computer system to react differently according to the inferred intent, rather than simply responding to the user input. The techniques discussed herein also enable the computer system to perform this intent-based response to a user-submitted query more quickly than could otherwise be performed using some other techniques. For example, the techniques discussed throughout this document enable the system to determine intent based on search system responses to search queries, and then leverage that information to inform the intent determination for the search queries. Furthermore, the intent inferences are performed on clusters of many queries that are all related, and the inference is based on an aggregate response to the queries in the cluster, such that all queries in the cluster are determined to have the same intent (e.g., local intent or non-local intent) based on the aggregate search system responses to the cluster of search queries. This provides a more accurate and robust intent classification process that benefits from the search system's treatment of all related queries in a cluster, rather than simply looking at the search system's treatment of a single query in isolation. This prevents certain characteristics (e.g., a particular feature related to a different intent) of a single query from overriding the more general intent of that single query when considered in the context of other queries that are related to that single query.

In some search operations, it is desirable to provide digital content with local content features when a search query is submitted that has a high location intent, and not provide local content features to digital content when the search query has a low location intent. The techniques discussed herein can facilitate the triggering presentation of local content features when a received search query has been deemed to be part of a high local intent query cluster, and not trigger presentation of the local content features when the received search query has been deemed to be part of a low local intent query cluster (or a query cluster that has not been deemed a high local intent query cluster). In some situations, the triggering of the local content features results in the modification of a particular portion of content to include local intent content (or other local intent features, such as user interface controls that trigger further actions).

Modifying content provided to specific sets or subsets of users can result in more efficient utilization of bandwidth and computing resources. For example, the amount of (or size of) content (e.g., a local content feature) provided to users that input a search query with high location intent can be higher than the amount of (or size of) content provided to users that input a search query with low location intent. Meanwhile, the local content feature aids users to more easily navigate to the digital content source, such as a webpage, or directly provides the user with local information about the digital content source such that the user would not need to navigate to the digital content source, thereby reducing the time and data transfer required for the user to arrive at the content of interest. For example, the local content feature format can include address information, a call button, a direction button (if available), and the like. Hence, the local content feature, which does not take a long time to download (e.g., text content), can allow a user device to initiate access information immediately from the digital content. In this way, less bandwidth is utilized if the user can bypass having to use a different application on the user device, or access the digital content web site first, to access the location or call information now provided in the local content feature.

Furthermore, segmenting the aggregated clusters of search queries into two or more subsets can improve prediction models for auto segmentation of a population of search queries (e.g., based on the location intent of the search query). Content providers can utilize the segmentation of the clusters of search queries to specify which percentage of local intent of the clusters should be provided local content features with their content in response to a particular submitted query. For example, a given content provider may specify that local content features should be provided with digital content results if a submitted search query belongs to a cluster that is determined to be greater than or equal to a local intent threshold, such as 60% or some other appropriate amount. Additionally, having the queries already grouped into clusters and assigned values to intent flags indicating that the query cluster is either a high local intent query cluster or a low local intent query cluster provides a more efficient utilization of computing resources and reduces errors (for example, layout errors within a webpage) that can be caused by failure to provide or delays in providing content features. For example, after a query is submitted, the digital content provider can quickly access a local intent database to determine if the query is high local intent or low local intent (e.g., based on a threshold), and determine whether to provide local content features without needing to access other databases or initiate further network data transactions. As such, the determination as to whether to provide local content features can be made quicker, with fewer memory/storage accesses and network transactions, than if the search system is used to provide that information, or if the digital content system makes that determination as a separate process.

In addition, in accordance with one or more embodiments, by determining the location intent of the query, analytic tools can be further enhanced with information that was not previously available. For example, the enhanced data can improve accuracy of predicting various outcomes related to the content, and in turn, improve the current systems that content providers and content distributors use to optimize distribution of content to users based on location intent of the search query. This improvement to the current system can result in users receiving content that is more aligned with their interests, while reducing the amount of less relevant content that these users receive. Thus, the improvements discussed in this document can lead to a more personalized and more efficient (e.g., in terms of bandwidth usage) online browsing experience, for example, by filtering content provided to a given user based on the location intent of the query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for modifying content and/or the distribution of content to a user based on a determined local intent of a submitted search query. For example, this document discusses determining the local intent of a query, and triggering modification of a digital component, e.g., such as inclusion of a local extension (e.g., phone number, address, map) for the digital component, when local intent of the query is determined to be over a threshold. A local extension is a formatting option that can be applied to a digital component. Some examples of local extensions include address information, a call button, a direction button (if available), and the like. Local extensions (also referred to herein as local content features) help users more easily navigate to the digital component source, or obtain information associated with the digital component source.

Figure 4B:
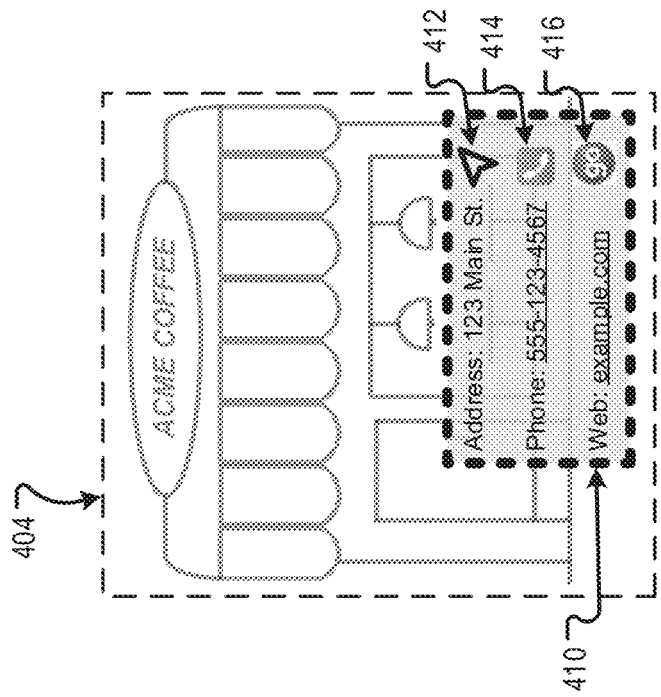
FIGS. 4A and 4B are example diagrams of digital content.

As discussed in more detail below, the local intent query cluster data is determined by analyzing existing clusters of queries that are provided by a pre-existing clustering algorithm, and the local intent of each cluster is determined. In some situations, the local intent of each given cluster is determined based on a portion (e.g., a percentage) of queries within that cluster that trigger a local search feature within the search system. For example, the local intent of each given cluster can be determined based on what percentage of the queries in that cluster trigger a local feature within a knowledge panel in the search results generated using those queries. Once the local intent of the query clusters has been determined, received queries can be assigned values to an intent flag indicating that the received query is a local intent query when they belong to a cluster that has been deemed to have sufficient local intent, and the digital content for the local intent queries can be modified to include a local content feature, e.g., a local extension before being provided in response to the queries. An example diagram that illustrates a local content feature with a digital content component is illustrated in FIG. 4B.

These features and additional features are described in more detail below. For brevity, the description that follows refers to user navigation among webpages and websites, but the description is also applicable with respect to native applications and/or combinations of different Internet connected resources.

Figure 1A:
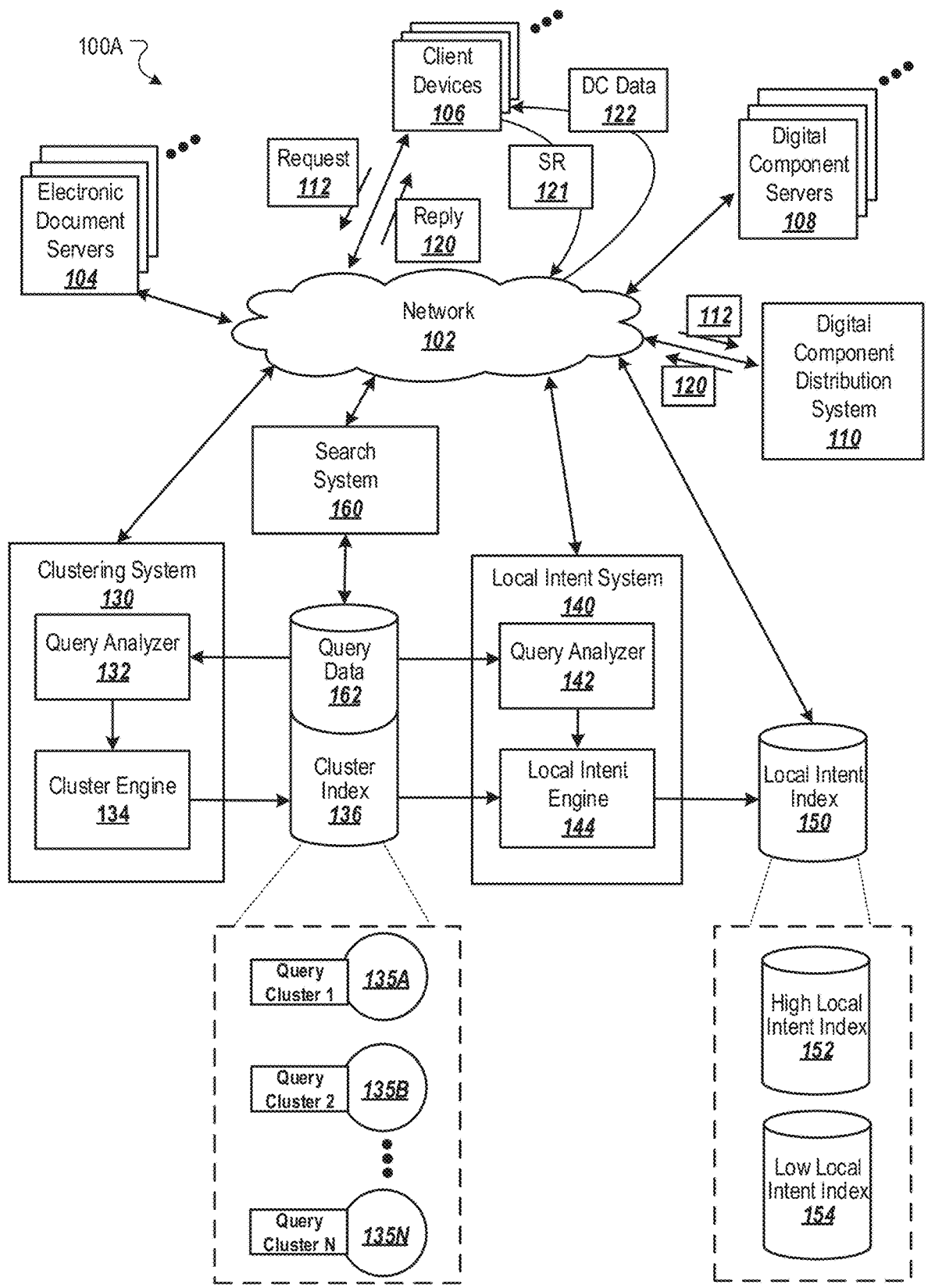
FIGS. 1A and 1B are block diagrams of an example environment for distributing content.
Figure 1B:
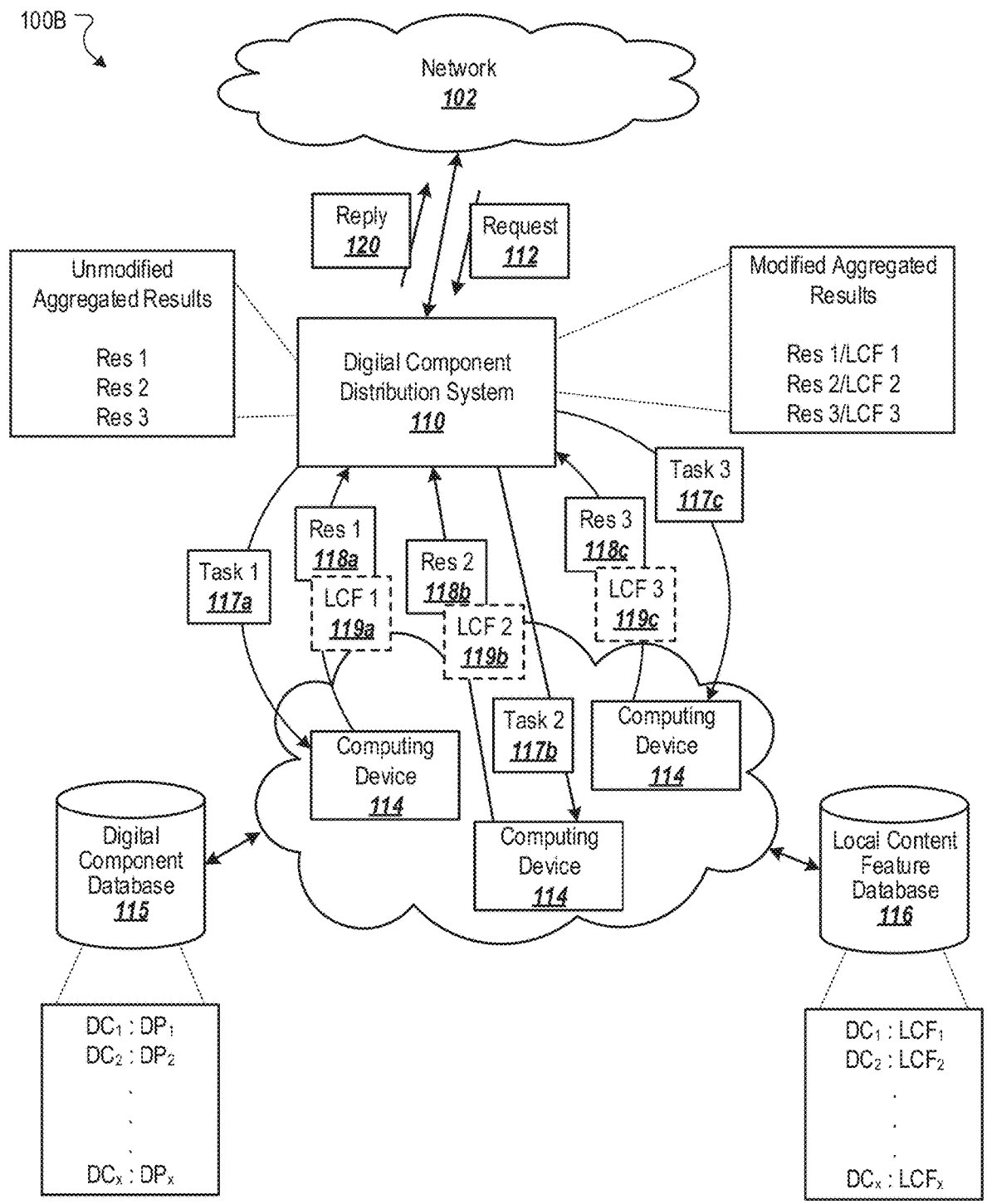

FIGS. 1A and 1B are block diagrams of an example environment 100A and 100B in which digital components are distributed for presentation on client devices with electronic documents. The example environment 100A includes a network 102, such as a local area network (LAN), a wide area network (WAN), the Internet, or a combination thereof. The network 102 connects electronic document servers 104, client devices 106, digital component servers 108, a digital component distribution system 110 (also referred to as a component distribution system or DCDS), a clustering system 130, a local intent system 140, and a search system 160. The example environment 100 may include many different electronic document servers 104, client devices 106, and digital component servers 108.

A client device 106 is an electronic device that is capable of requesting and receiving resources over the network 102. Example client devices 106 include personal computers, mobile communication devices (e.g., smartphones), and other devices (e.g., tablet devices or wearable computing devices) that can send and receive data over the network 102. A client device 106 typically includes a user application, such as a web browser, to facilitate the sending and receiving of data over the network 102, but native applications executed by the client device 106 can also facilitate the sending and receiving of data over the network 102.

In another example, the electronic document servers 104 can include app servers from which client devices 106 can download apps. In this example, the client device 106 can download files required to install an app at the client device 106, and then execute the downloaded app locally.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic document server 104 that hosts the given publisher webpage can respond to the request by sending machine executable instructions that initiate presentation of the given webpage at the client device 106.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 106 to request content from the data source when the given electronic document is processed (e.g., rendered or executed) by a client device 106. The client device 106 integrates the content obtained from the data source into the given electronic document to create a composite electronic document including the content obtained from the data source. An electronic document (which for brevity is also simply referred to as a document) does not necessarily correspond to a file. A document may be stored in a portion of a file that holds other documents, in a single file dedicated to the document in question, or in multiple coordinated files. An electronic document can be in the form of a web page, a native application user interface, or another appropriate electronic format.

As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component.

In some situations, a given electronic document can include one or more digital component tags or digital component scripts that reference the digital component distribution system 110. In these situations, the digital component tags or digital component scripts are executed by the client device 106 when the given electronic document is processed by the client device 106. Execution of the digital component tags or digital component scripts configures the client device 106 to generate a request for one or more digital components 112 (referred to as a "component request"), which is transmitted over the network 102 to the digital component distribution system 110, that includes one or more digital component servers. For example, a digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The component request 112 can include event data specifying other event features, such as the electronic document being requested and characteristics of locations of the electronic document at which digital components can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results. As used throughout this document, the term search query and query should be interpreted as covering queries beyond traditional search queries that are submitted through a traditional search engine, such as the search system 160. For example, these terms are intended to cover other types of queries, such as voice queries, voice commands, or voice instructions that are received by an artificial intelligence assistant, as well as other interactions with an artificial intelligence assistant.

An artificial intelligence assistant can be implemented in a variety of devices, such as mobile phones, tablet devices, desktop computing devices, televisions, appliances, or dedicated assistant devices. The devices that include an artificial intelligence assistant generally include a microphone that receives voice input from a user (e.g., such as commands and/or search queries) and a speaker that provides an audible response to the user's voice input. These devices can also include displays that can provide visual feedback and/or be communicatively connected to other devices (e.g., televisions or other displays or other speakers) to provide audio and/or visual information to the user.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a desktop device, a mobile device, or a tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110 chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

Figures 3A, 3B:
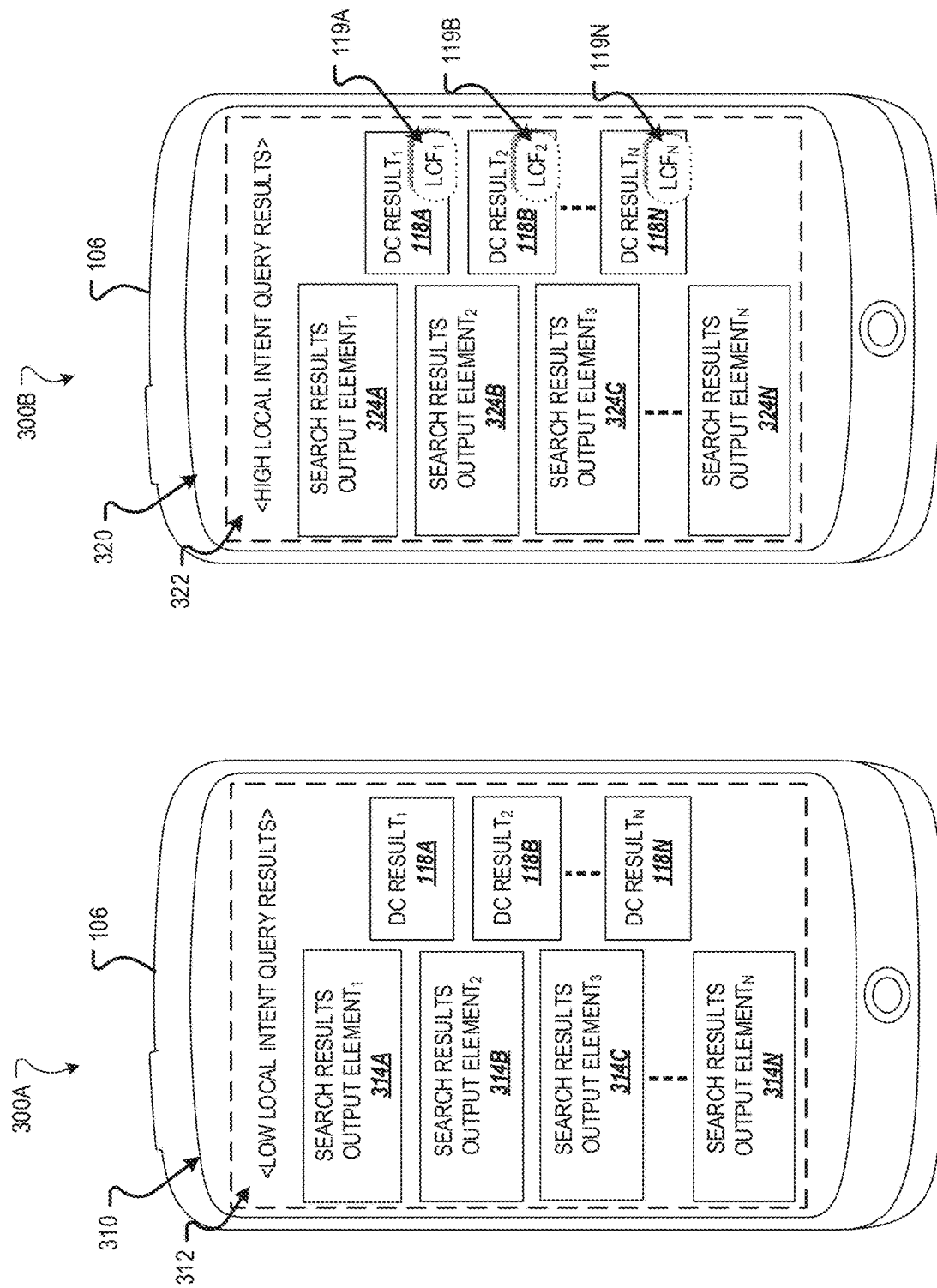
FIGS. 3A and 3B are example screen shots of a mobile device that presents display data describing query results based on local intent of a query.

In some implementations, the digital component distribution system 110 is implemented in a distributed computing system in order to process component requests and provide one or more digital components responsive to the request in the limited amount of time for doing so (e.g., in less than a second). The distributed computing system includes, for example, a server and a set of multiple computing devices 114 that are interconnected and identify and distribute digital component in response to requests 112. The set of multiple computing devices 114 operate together to identify a set of digital components (and corresponding local content features if available) that are eligible to be presented in the electronic document from among a corpus of millions of available digital components (DC1-x). The millions of available digital components can be indexed, for example, in a digital component database 115. The associated local content features for each respective digital component (if available) can be indexed, for example, in a local content feature database 116, where each digital component index entry can reference the corresponding local content feature (LCF1-LCFx). Each digital component index entry in the digital component database 115 can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component. Additionally, the distribution parameters can contribute to the transmission of a digital component by requesting a local content feature to be included with the transmission of the digital component when it is determined from the component requests that a query is matched to a cluster of queries that is determined to be a high local intent cluster. Including the local content feature with the transmission of the digital component is shown in FIGS. 3B, 4B, and further described below.

In some implementations, the distribution parameters for a particular digital component can include distribution keywords that must be matched (e.g., by electronic documents, document keywords, a search query, or terms specified in the component request 112) in order for the digital component to be eligible for presentation. In other words, the distribution parameters are used to trigger distribution (e.g., transmission) of the digital components, and corresponding local content features for high local intent queries, over the network 102. The distribution parameters can also require that the component request 112 include information specifying a particular geographic region (e.g., country or state) and/or information specifying that the component request 112 originated at a particular type of client device (e.g., desktop device, mobile device, or tablet device) in order for the digital component to be eligible for presentation. The distribution parameters can also specify an eligibility value (e.g., ranking score, bid, or some other specified value) that is used for evaluating the eligibility of the digital component for distribution/transmission (e.g., among other available digital components).

The identification of the eligible digital component can be segmented into multiple tasks 117a-117c (e.g., by the server) that are then assigned (e.g., by the server) among computing devices (e.g., 114, 114b, and 114c) within the set 114. For example, different computing devices in the set 114 can each analyze a different portion of the digital component database 115 to identify various digital components having distribution parameters that match information included in the component request 112. Additionally, different computing devices in the set 114 can each analyze a different portion of the local content feature 116 to identify the respective local content features that are associated with each respective digital components if it is determined from the component request 112 that a query.

In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital components that are eligible for distribution in response to the component request 112 and/or a subset of the digital components that have certain distribution parameters. The identification of the subset of digital components can include, for example, comparing the event data to the distribution parameters, and identifying the subset of digital components having distribution parameters that match at least some features of the event data.

In some implementations, the results (Res 1-Res 3) 118a-118c of the analysis from each given computing device in the set 114 include (LCF 1-LCF 3) 119a-119c in the same transmission which are sent to the digital component distribution system 110 as modified results. For example, the results 118a-118c and the local content features 119a-119c provided by each of the computing devices in the set 114 may identify a subset of digital components and local content features that are eligible for distribution in response to the component request 112 based on the local intent analysis, as discussed below.

The digital component distribution system 110 aggregates the results 118a-118c received from the set of multiple computing devices 114 and uses information associated with the aggregated results to select one or more digital components that will be provided in response to the request 112. The digital component distribution system 110 aggregates the results 118a-118c as unmodified aggregated results when it is determined that local content features are not requested based on the local intent analysis, as discussed below. Alternatively, the digital component distribution system 110 aggregates the results 118a-118c and the local content features 119a-199c as modified aggregated results when it is determined that local content features are requested based on the local intent analysis. For example, the digital component distribution system 110 can select a set of digital components (one or more digital components) based on the outcome of one or more component evaluation processes. In turn, the digital component distribution system 110 can generate and transmit, over the network 102, reply data 120 (e.g., digital data representing a reply) that enables the client device 106 to integrate the set of digital components, and corresponding local content features if applicable, into the given electronic document, such that the set of digital components and the content of the electronic documents are presented together at a display of the client device 106 (e.g., as shown in FIG. 3A without local content features, and FIG. 3B with local content features).

In some implementations, the client device 106 executes instructions included in the reply data 120, which configures and enables the client device 106 to obtain the set of digital components, and corresponding local content features if applicable, from one or more digital component servers 108. For example, the instructions in the reply data 120 can include a network location (e.g., a Uniform Resource Locator (URL)) and a script that causes the client device 106 to transmit a server request (SR) 121 to the digital component server 108 to obtain a given digital component from the digital component server 108. In response to the request, the digital component server 108 will identify the given digital component specified in the server request 121 (e.g., within a database storing multiple digital components) and transmit, to the client device 106, digital component data (DC Data) 122 that presents the given digital component in the electronic document at the client device 106.

To facilitate searching of electronic documents, the environment 100 can include a search system 160 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index (e.g., hardware memory device(s)). Data that are associated with an electronic document is data that represents content included in the electronic document and/or metadata for the electronic document.

The search system 160 can generate and maintain a historical query log. For each of a large number (e.g., millions) of search queries previously processed by the search system 160, the historical query log indexes the previous search query by maintaining data which specifies: (i) the previous search query, (ii) search results provided by the search system 160 in response to the previous search query, (iii) data on which search queries and/or search results trigger generating a local knowledge panel feature, and (iv) user selection data which specifies one or more of the search results that were selected by the user of the client device which transmitted the previous search query.

The search index and the historical query log are stored within the query data store 162 that can be accessed by the search system 160, and also accessed by the clustering system 130 and local intent system 140, which are described below. In some implementations, the search index and the historical query log are separate databases.

Client devices 106 can submit search queries to the search system 160 over the network 102. In response, the search system 160 accesses the search index in the query data store 162 to identify electronic documents that are relevant to the search query. The search system 160 identifies the electronic documents in the form of search results and returns the search results to the client device 106 in a search results page. A search result is data generated by the search system 160 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Like other electronic documents, search results pages can include one or more slots in which digital components can be presented.

Search queries that are submitted by client devices 106 can be used to identify one or more digital components that are presented with the search results page. For example, the digital component distribution system 110 can use the search query to identify digital components having distribution parameters that match (e.g., are the same as or otherwise match due at a specified level of similarity, such as qualifying under phrase matching or expanded matching, including plurals, stubs, synonyms, and other variants that are sufficiently similar to) the search query. The identification of the one or more digital components using the search query can be performed in a manner similar to that discussed above.

Another example search result can include a title of a downloadable application, a snippet of text describing the downloadable application, an image depicting a user interface of the downloadable application, and/or a URL to a location from which the application can be downloaded to the client device 106. In some situations, the search system 160 can be part of, or interact with, an application store (or an online portal) from which applications can be downloaded for install at a client device 106 in order to present information about downloadable applications that are relevant to a submitted search query.

In some implementations, the search system 160 generates a knowledge panel and presents a knowledge panel with search results (or other pages) to provide data regarding particular entities that have been identified as relevant to a search query. A knowledge panel is a user interface element that provides information or other content related to a particular entity referenced by a search query, such as a person, place, country, landmark, animal, historical event, organization, business, sports team, sporting event, movie, song, album, game, work of art, or any other entity. A knowledge panel can include a local feature, also referred to herein as local knowledge panel feature. For example, a local knowledge panel feature can include a map to a location of the identified entity, etc.

Presenting the knowledge panel with the search results reduces the number of web pages users have to visit in order to obtain factual information for which the users are searching, thereby reducing the time required for the users to find information that satisfies their informational needs. Knowledge panel templates developed for particular types of entities enable content relevant to the entities to be displayed to users. In some implementations, a knowledge panel provides a summary of information for the entity that is collected from multiple different content sources, whereas search results generally reference a single content source. For example, a knowledge panel for a singer may include the name of the singer, an image of the singer, a description of the singer, one or more facts about the singer, and content that identifies songs and albums recorded by the singer. Other types of information and content can also be presented in the knowledge panel.

In some implementations, to trigger a knowledge panel, when a search query is received, the search system 160 can determine whether to provide a knowledge panel with search results for the search query, and whether to provide a local knowledge panel feature. This determination may be based, in part, on whether the received query is determined to reference a known entity. In some implementations, the system determines whether the received query references a known entity based on a comparison of the received query, or terms of the received query, to an entity index that identifies known entities and their aliases. If a match is determined to exist based on the comparison, the received query is determined to reference the known entity, and the system may provide a knowledge panel for the matching entity. The knowledge panel can include a local knowledge panel feature, such as a map, if the entity identified is linked to a known local knowledge panel feature.

In some implementations, a knowledge panel apparatus may generate a knowledge panel by populating an identified knowledge panel template with content items and provide the generated knowledge panel to the search system 160. In turn, the search system 160 can provide the identified search results and the knowledge panel to the client device 106 for presentation. The knowledge panel apparatus can determine the type of entity referenced by the received search query and retrieve the appropriate knowledge panel template for the entity, including any local knowledge panel features associated with that entity. For example, an index of the content items may include data identifying the type of entity for each entity indexed therein. In another example, the index of the content items may include data identifying the appropriate knowledge panel template for each entity. The knowledge panel apparatus can access the index to identify the appropriate template for the entity referenced by the received search query, which may include a local knowledge panel feature. For example, the knowledge panel templates may include one or more "person" templates, "place" templates, "landmark" templates, "movie" templates, "business" templates, "game" templates, "sports team" templates, "sports event" templates, and/or "disambiguation" templates. A knowledge panel template for a particular type of entity may have placeholders for different content item types than a knowledge panel template for another type of entity. For example, a knowledge panel template for a country may include a placeholder for a set of images of cities in the country, while a knowledge panel template for a landmark may include a placeholder for a set of images of other landmarks.

The content of a knowledge panel may include content published or otherwise provided by multiple resources, such as multiple web pages. For example, a knowledge panel for a landmark may include an image of the landmark that has been published on a first web page that is hosted by a first publisher. The knowledge panel may also include a set of facts about the landmark that have been published on a second web page published by a second publisher different from the first publisher.

A knowledge panel may be presented inline or adjacent to other search results for a received query or in place of the other search results. For example, standard search results that provide a link to resources deemed to be responsive to the search query may be presented on one side of a search results page and a knowledge panel may be presented on the other side of the search results page.

The clustering system 130 is used to identify query clusters, e.g., a set of search queries that have been included in a same query cluster based on one or more matching query features. The clustering system 130 includes the query analyzer 132 and the cluster engine 134 that are each shown as separate engines or servers. The query analyzer 132 and the cluster engine 134 are each examples of an engine implemented as computer programs on one or more computers in one or more locations in which the systems, components, and techniques described below are implemented. Alternatively, the query analyzer 132 and the cluster engine 134 could each reside within the same server.

The query analyzer 132 processes query data from the query data store 162 to identify one or more query features for each query. The cluster engine 134 processes the data from the query analyzer 132 to determine similarities and matches between the one or more query features and to generate an index of query clusters, such as query cluster-1 135A, query cluster-2 135B, query cluster-N 135N, etc., and sends the index of query clusters to the cluster index 136. For example, the generated query clusters may be grouped as a set of queries and classified as related to a same topic. Additionally, or alternatively, the query clusters generated may be grouped as a set of queries and classified as providing similar search results. The clustering technique is not significant as the way in which the system determines local intent, as the local intent system 140 and the processes therein, as described below, can be performed on any set of clusters provided to the system.

The local intent system 140 includes the query analyzer 142 and the local intent engine 144, that are each shown as separate engines or servers. The query analyzer 142 and the local intent engine 144 are each examples of an engine implemented as computer programs on one or more computers in one or more locations in which the systems, components, and techniques described below are implemented. Alternatively, the query analyzer 142 and the local intent engine 144 could each reside within the same server.

The query analyzer 142 receives query data from the query data store 162 to determine which queries trigger a local search feature, such as a local feature of the knowledge panel, and sends the results to the local intent engine 144. The local intent engine 144 receives cluster index data from the cluster index 136 to analyze each individual query cluster 135A, 135B, 135N, etc. The local intent engine 144 analyzes and assigns values to each intent flag for each query cluster indicating the local intent of each query cluster, and sends the results to the local intent index 150. The local intent index 150 then stores information identifying each analyzed cluster as either a high local intent query cluster or a low local intent query cluster depending on the outcome of the analysis from the local intent engine 144. In some implementations, separate indexes could be created, such that information identifying high local intent query clusters and/or queries could be stored in a high local intent index 152, while information identifying low local intent query clusters and/or queries could be stored in a low local intent index 154. In these implementations, determining whether a user submitted query was directed to a high local intent query could be performed by identifying the query cluster that includes the user submitted query, and determining if that query cluster is identified in the high local intent index 154. This would reduce the amount of processing required at query time, such that the determination of local intent and operations performed based on that determination could be performed more quickly than would be possible using less efficient procedures. An example data flow for the local intent system 140 for assigning values to intent flags to indicate whether each query cluster is a high local intent cluster or a low local intent cluster is illustrated in FIG. 2.

Figure 2:
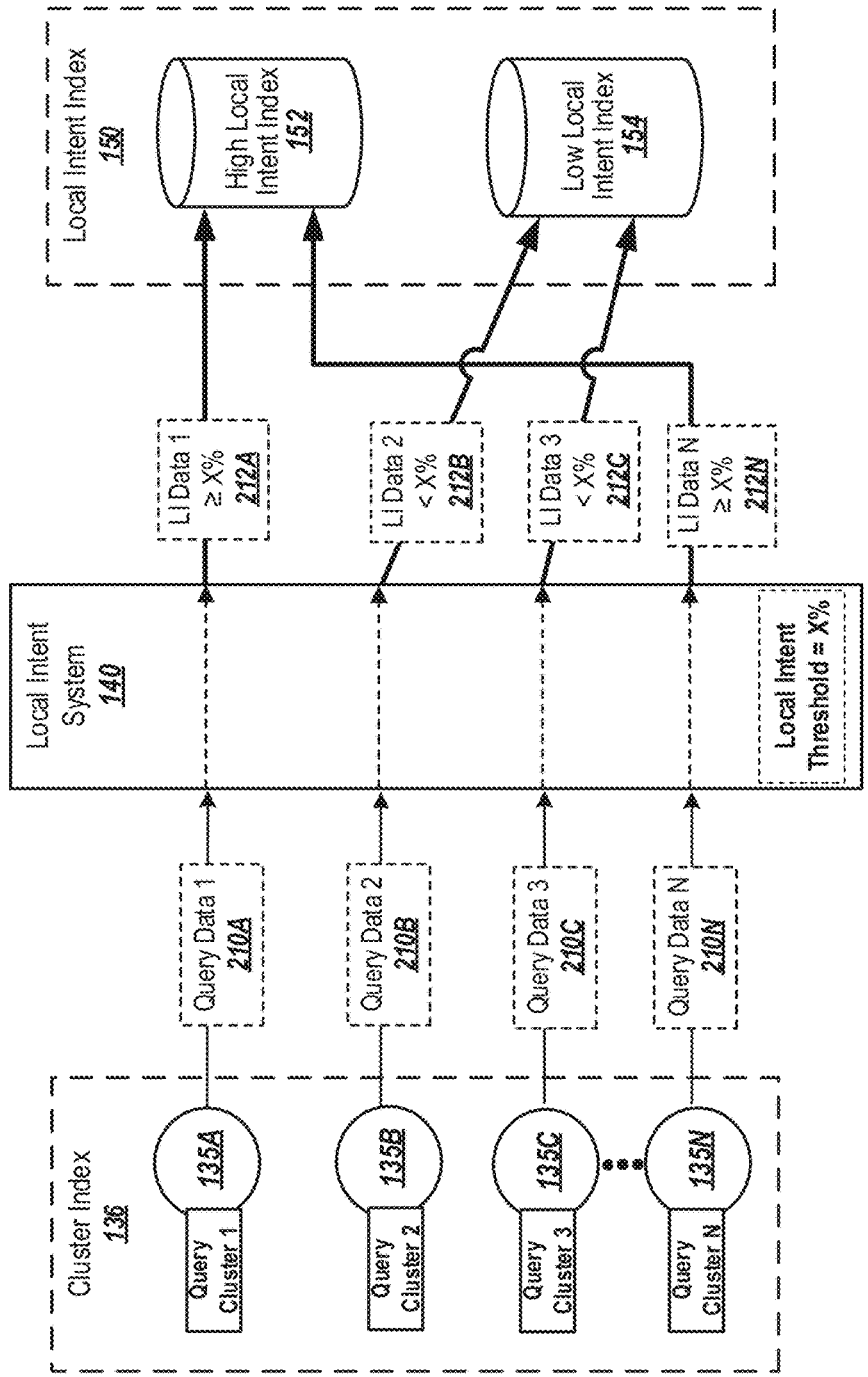
FIG. 2 is a system flow diagram of an example local intent system for analyzing query data.

FIG. 2 is a system flow diagram of an example local intent system 140 for assigning values to intent flags for query clusters to indicate that each query cluster is either a high local intent query cluster or a low local intent query cluster. The local intent system 140 is an example of a system implemented as computer programs on one or more computers in one or more locations in which the systems, components, and techniques described below are implemented. As described with reference to FIG. 1A, the local intent system 140 can process query cluster data to maintain intent flags for each cluster that indicate whether each cluster is either a high local intent cluster, or a low local intent cluster. For example, query cluster-1 135A, stored in the cluster index 136, and is sent as query data-1 210A to the local intent system 140. The local intent system 140 analyzes the query data-1 210A to determine what portion (e.g., percentage) of queries within that cluster trigger a local search feature, such as a local knowledge panel feature. The queries that trigger the local search feature can be referred to as trigger queries. The local intent system 140 then compares the portion of queries in that cluster that are trigger queries to a local intent threshold (e.g., X %) to assign a value to the intent flag for that particular cluster to indicate the particular cluster is either (i) a high local intent if the portion of trigger queries meets the local intent threshold (e.g., is greater than or equal to the threshold X %), or (ii) a low local intent if the portion of trigger queries does not meet the local intent threshold (e.g., is greater than or equal to the threshold X %). The local intent threshold can be specified by the local intent system provider, the digital component distribution provider or another entity that is responsible for specifying the local intent threshold.

After the local intent system 140 compares the portion of trigger queries in the query cluster-1 135A to a local intent threshold X % to determine that particular cluster as meeting the threshold X %, the local intent system 140 generates and sends local intent data-1 212A to the high local intent index 152. Similar, as shown in FIG. 2, the local intent system 140 determines that query data-2 210B from query cluster-2 135B and query data-3 210C from query cluster-3 135C do not meet the local intent threshold, and thus sends local intent data-2 212B and local intent data-3 212C to the low local intent index 154. This process continues for each received query data-N 210N from each respective query cluster-N 135N such that every query cluster 135 can be assigned values to the intent flags accordingly and information identifying the query cluster 135 and/or each individual query can be stored in the local intent index 150 to be accessed by the search system 160 or the digital component distribution system 110.

In some implementations, query clusters can be assigned values to the intent flags indicating three or more groups of query clusters depending on the number of levels or thresholds the local intent system 140 uses. For example, the digital component distribution provider may desire to provide more local content feature data for queries that are determined at greater than 90% (i.e., a very high local intent cluster) than those that are determined as only 60% of queries in the cluster as triggering local search features (i.e., an intermediate local intent cluster). Those query clusters determined to be an intermediate local intent cluster may still meet the initial local intent threshold, but are not desired to provide as much data in the corresponding local content features as a cluster that is determined to be a very high local intent cluster. For example, a very high local intent cluster may include a call button, a direction button, and a website link in the local content feature, but the intermediate local intent cluster may only include a phone number.

The determination of whether to distribute a local content feature with a digital component to a given user can be informed by information about location intent of a submitted search query. For example, when the given user has submitted a search query, the system can determine to distribute a local content feature with each digital component to the given user when a high local intent of the submitted user query is determined. In contrast, the system can determine that no local content feature is to be distributed with the digital component to the given user when a low local intent of the submitted user query is determined.

Processes and examples for modifying the distribution of content to a user based on the determined location intent of a query using a digital component distribution system 110 is now described with reference to FIGS. 3-6 below.

FIGS. 3A and 3B are example screen shots of a mobile device that present display data describing query results based on local intent of a query.

FIG. 3A is an example screen shot after a user entered a search query that the local intent index 150 has assigned a value to the intent flag indicating that the given search query is a low local intent query, thus the digital content results do not include local content features. FIG. 3A depicts a screen shot 300A of an example user interface 310 presenting, from a search query, low local intent query results 312 with search results output elements 314A, 314B, 314C, 314N, etc., and digital component results 118A, 118B, 118N, etc. In the example screen shot 300A, after a user performs a search operation in a search application, a user interface 310 of the user device 106 enables a user to select any of the search results output elements 314 or digital component results 118.

FIG. 3B is an example screen shot after a user entered a search query that the local intent index 150 has assigned a value to the intent flag indicating that the given search query is a high local intent query, thus the digital content results include local content features. FIG. 3B depicts a screen shot 300B of an example user interface 320 presenting, from a search query, high local intent query results 322 with search results output elements 324A, 324B, 324C, 324N, etc., and digital component results 118A, 118B, 118N, etc. The digital component results 118A, 118B, 118N are shown to each have corresponding local content features 119A, 119B, 119N, respectively, that are displayed as a graphic overlay on the respective digital component result 118. Not all digital component results 118 are required to have a corresponding local content feature 119, as the local content feature 119 could be triggered in less than all of the digital component results 118 (e.g., only in 118A). In the example screen shot 300B, after a user performs a search operation in a search application, a user interface 320 of the user device 106 enables a user to select any of the search results output elements 314, digital component results 118, or a local content feature 119. For example, the local content feature 119A may include both a direction/map feature button and a call button that corresponds to the entity or subject matter of the corresponding digital component result 119A. Both the direction/map feature button and the call button could each be selected separately by a user, and after the selection, the client device 106 would initiate a corresponding application to the select button.

Figure 4A:
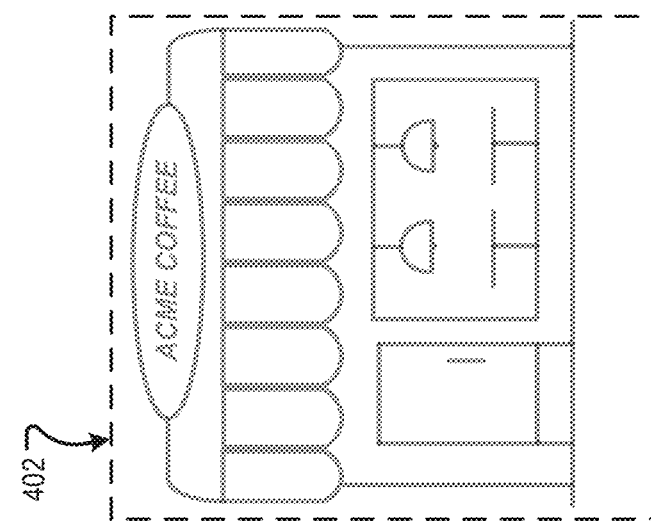

FIGS. 4A and 4B are example diagrams of digital content. In particular, FIG. 4A depicts an example digital component result 402 of a coffee house, "Acme Coffee," such as digital component result 118A from FIG. 3A, without a local content feature. FIG. 4B also depicts an example digital component result 404 of a coffee house, "Acme Coffee," such as digital component result 118A from FIG. 3B. However, FIG. 4B includes a local content feature 410 as a graphic overlay on the digital component result 404. As shown in FIG. 4B, the local content feature 410 includes an address, phone number, and a website. Additionally, the local content feature 410 includes interactive user interface objects 412, 414, and 416. For example, the interactive user interface object 412 corresponds to the address, and when selected (e.g., clicked or tapped), would launch either a navigation application on the client device 106, or a web browser application that directs the user to a navigation website. The interactive user interface object 414 corresponds to the phone number, and when selected (e.g., clicked or tapped), would launch a phone application on the client device 106. The interactive user interface object 416 corresponds to a web site URL to the entity's website, and when selected, would launch a web browser application that directs the user to the entity's website, www.example.com. The local content feature 410 can include any combination of the interactive user interface objects 412, 414, and 416. Additionally, or alternatively, the local content feature 410 can include different features that present local features associated with the digital component 404 and/or the entity depicted in the digital component 404, "Acme Coffee." In some situations, the local content feature 410 does not need to include any interactive user interface objects, and would be general location information only (e.g. text only).

Figure 5:
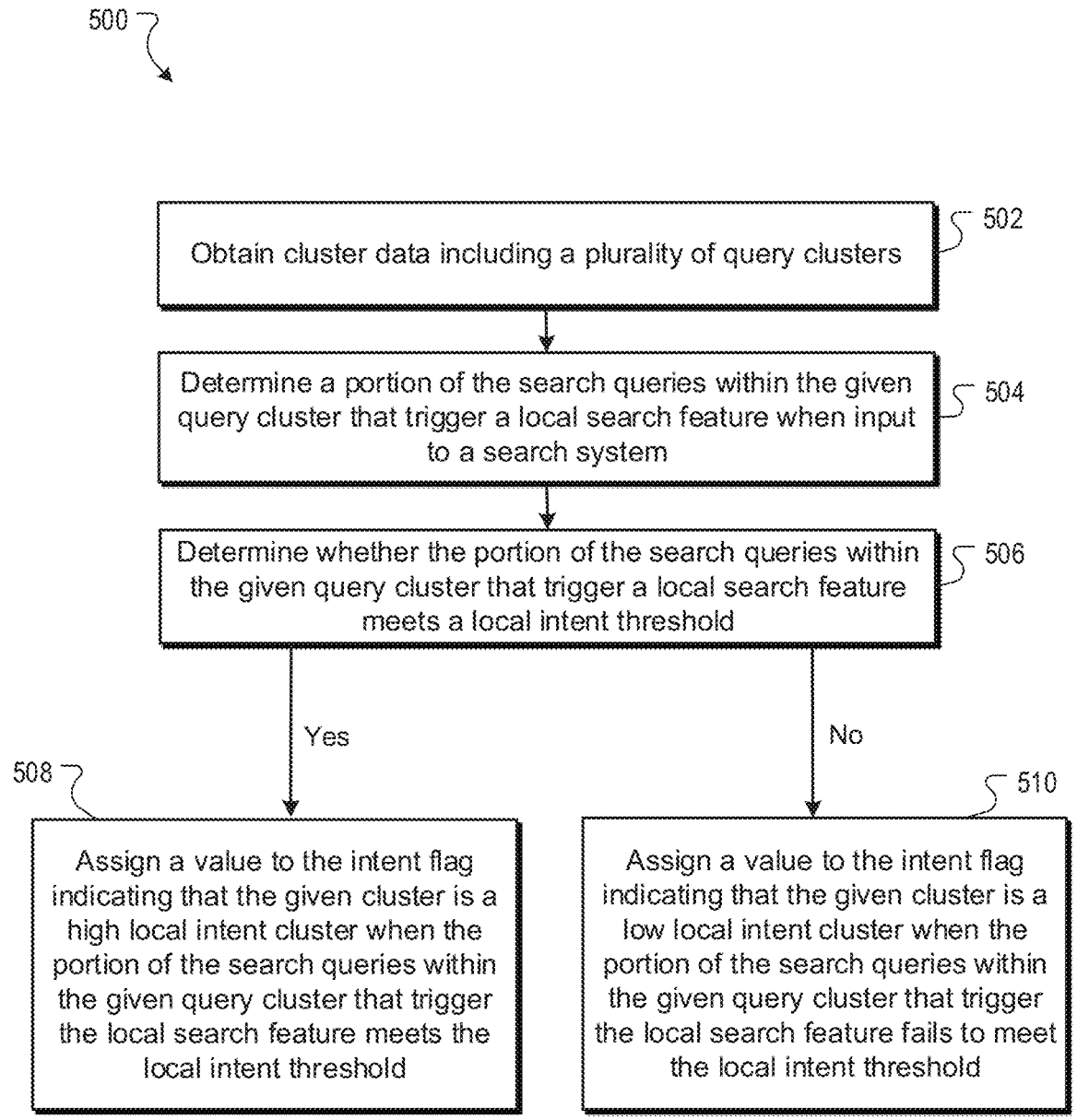
FIG. 5 is a flowchart of an example process for using a local intent system.

FIG. 5 is a flow diagram of an example process 500 for using a local intent system. The process 500 can be implemented, for example, by the local intent system 140 of FIGS. 1A and 2. Operations of the process 500 can also be implemented as instructions stored on non-transitory computer readable media, and execution of the instructions be one or more data processing apparatus can cause the one or more data processing apparatus to perform the operations of the process 500.

The process 500 obtains cluster data including a plurality of query clusters, where each query cluster is a set of search queries that have been included in a same query cluster based on one or more matching query features (502). For example, FIG. 1A illustrates the local intent engine 144 of the local intent system 140 receiving cluster index data from the cluster index 136 to analyze each individual query cluster 135A, 135B, 135N, etc.

After cluster data is obtained, the process 500 proceeds to steps 504-510 for each given query cluster from among the plurality of query clusters. The process 500 determines a portion of the search queries within the given query cluster that trigger a local search feature when input to a search system (504). For example, FIG. 1A illustrates the query analyzer 142 of the local intent system 140 receiving query data from the query data store 162 to determine which queries trigger a local search feature, such as a local feature of the knowledge panel, and sending the results to the local intent engine 144. The knowledge panel can include a local knowledge panel feature, such as a map, if the entity identified is linked to a known local knowledge panel feature. An example local knowledge panel feature could also include one or more of the interactive user interface objects 412, 414, or 416 as described herein for FIG. 4B, that are associated as a map button (e.g., navigational directions to a location), a call button, or a website, respectively.

The process 500 determines whether the portion of the search queries within the given query cluster that trigger a local search feature meets a local intent threshold (506). For example, the local intent system 140, as described herein for FIG. 2, can calculate which portion (e.g., percentage) of the search queries within the given query cluster trigger a local search feature and compare that portion to a specified local intent threshold (e.g., X %). For example, the local intent of each given cluster can be determined based on what percentage of the queries in that cluster trigger a local feature within a knowledge panel in the search results generated using those queries.

The process 500 assigns a value to the intent flag that the given cluster is a high local intent cluster when the portion of the search queries within the given query cluster that trigger the local search feature meets the local intent threshold (508). For example, FIG. 2 illustrates query cluster-1 135A, stored in the cluster index 136, being sent as query data-1 210A to the local intent system 140. The local intent system 140 then compares the portion of queries in that cluster from the query data-1 210A that are trigger queries to the local intent threshold (e.g., X %) to assign a value to the intent flag to indicate that a particular cluster is a high local intent because the portion of trigger queries meets the local intent threshold (e.g., is greater than or equal to the threshold X %), and thus sends local intent data-1 212A to the high local intent index 152.

The process 500 assigns a value to the intent flag that the given cluster is a low local intent cluster when the portion of the search queries within the given query cluster that trigger the local search feature fails to meet the local intent threshold (510). For example, FIG. 2 illustrates query cluster-2 135B, stored in the cluster index 136, being sent as query data-2 210B to the local intent system 140. The local intent system 140 then compares the portion of queries in that cluster from the query data-2 210B that are trigger queries to the local intent threshold (e.g., X %) to assign a value to the intent flag to indicate that the particular cluster is a low local intent because the portion of trigger queries does not meet the local intent threshold, and thus sends local intent data-2 212B to the low local intent index 154.

In some situations, the local intent system 140 can analyze each query within each cluster to identify which queries trigger presentation of a local knowledge panel. In these situations, the process of determining a portion of the search queries within the given query cluster that trigger a local search feature when input to a search system may include, for each given search query within the given query cluster, determining whether the given query triggers presentation of a local knowledge panel in a search results page generated by the search system using the given search query, determining a total number of the given search queries that trigger presentation of the local knowledge panel, and determining the portion of the search queries based on a ratio of the total number of the given search queries that trigger presentation of the local knowledge panel relative to how many search queries are in the given query cluster.

For example, FIG. 1A depicts the query analyzer 142 of the local intent system 140 receiving query data from the query data store 162. The query analyzer 142 determines whether each query triggers presentation of a local knowledge panel in a search results page generated by the search system using the given search query, and sends the results to the local intent engine 144. The knowledge panel can include a local knowledge panel feature, such as a map, if the entity identified is linked to a known local knowledge panel feature. An example local knowledge panel feature could also include one or more of the interactive user interface objects 412, 414, or 416 as described herein and illustrated in FIG. 4B, that are associated as a map button (e.g., navigational directions to a location), a call button, or a website, respectively. After the local intent engine 144 receives the results from the query analyzer 142 of whether a query triggered presentation of a local knowledge panel in a search results page, the local intent engine 144 determines a total number of the given search queries that trigger presentation of the local knowledge panel. The local intent engine 144 then determines the portion of the search queries based on a ratio of the total number of the given search queries that trigger presentation of the local knowledge panel relative to how many search queries are in the given query cluster.

In some situations, the local intent system 140 can analyze local attributes of each query within each query cluster to identify which queries trigger presentation of one or more local elements in a search results page. In these situations, the process of determining a portion of the search queries within the given query cluster that trigger a local search feature when input to a search system may include, for each given search query within the given query cluster, determining whether the given query includes local attributes that triggers presentation of one or more local elements in a search results page generated by the search system using the given search query, determining a total number of the given search queries that trigger presentation of one or more local elements, and determining the portion of the search queries based on a ratio of the total number of the given search queries that trigger presentation of one or more local elements relative to how many search queries are in the given query cluster.

For example, FIG. 1A depicts the query analyzer 142 of the local intent system 140 receiving query data from the query data store 162. The query analyzer 142 determines whether the given query includes local attributes that triggers presentation of one or more local elements in a search results page generated by the search system using the given search query, and sends the results to the local intent engine 144. Local attributes are used by search systems, such as search system 160, to use and present attributes for the specific entities within the search results. The local elements can be specific to the entity and determined by the search engine provider or by the specific entity. An example local element, as discussed herein, is a map feature associated with the address of the entity. However, local elements can include several different local elements specific to the type of entity. For example, restaurants can note that they accept reservations, or that they offer gluten free options, hotels can specify if they welcome dogs, grocery stores can highlight the organic products they offer, etc. After the local intent engine 144 receives the results from the query analyzer 142 of whether one or more local elements were presented in a search results page, the local intent engine 144 then determines a total number of the given search queries that trigger presentation of one or more local elements. The local intent engine 144 then determines the portion of the search queries based on a ratio of the total number of the given search queries that trigger presentation of one or more local elements relative to how many search queries are in the given query cluster.

Figure 6:
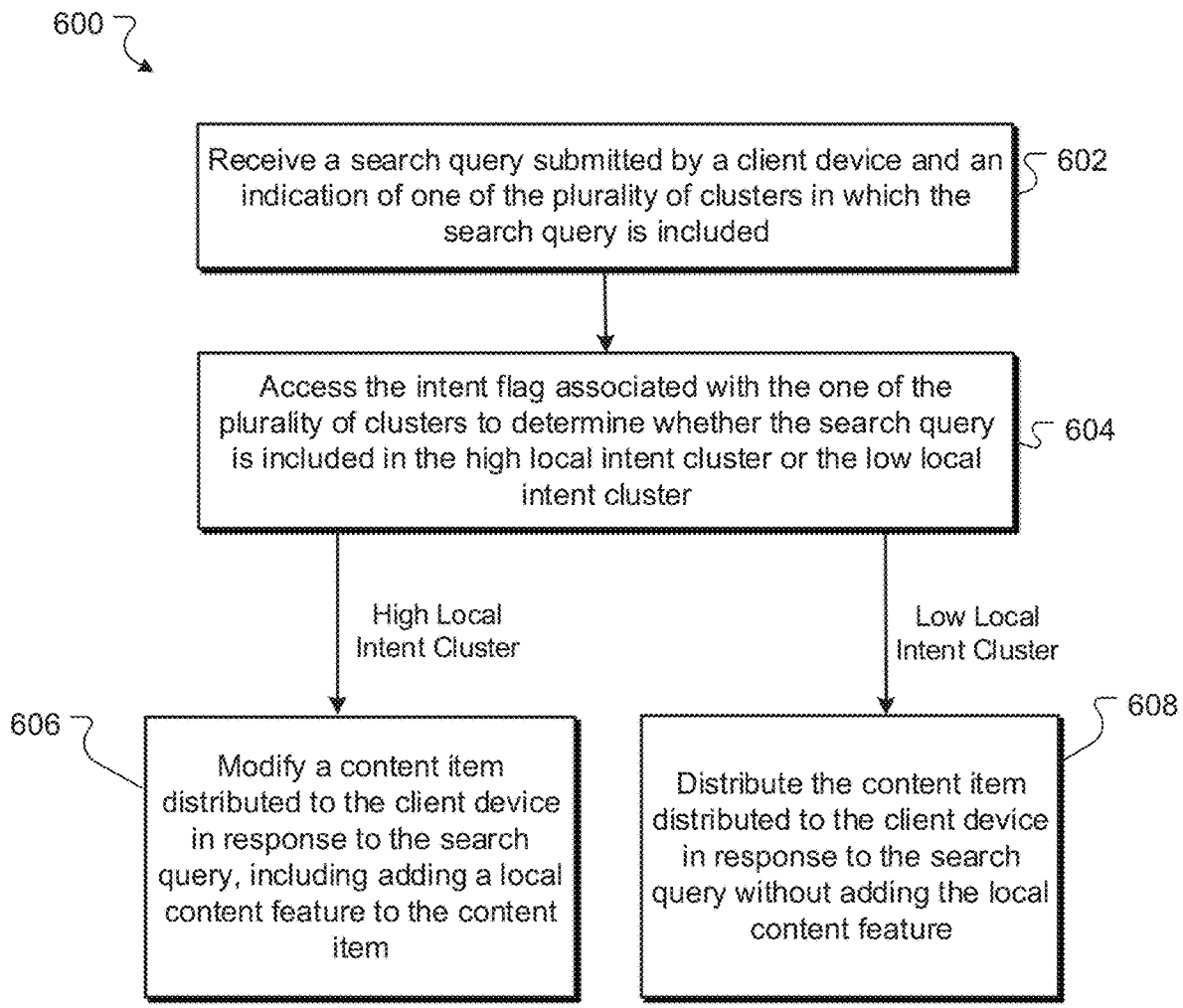
FIG. 6 is a flowchart of an example process for using a digital component distribution system.

FIG. 6 is a flow diagram of an example process 600 for using a digital component distribution system. The process 600 can be implemented, for example, by the digital component distribution system 110 of FIGS. 1A and 1B. Operations of the process 600 can also be implemented as instructions stored on non-transitory computer readable media, and execution of the instructions be one or more data processing apparatus can cause the one or more data processing apparatus to perform the operations of the process 600.

The process 600 receives a search query submitted by a client device and an indication of one of the plurality of clusters in which the search query is included (602). For example, FIG. 1B illustrates the digital component distribution system 110 receiving a component request 112 transmitted over the network 102 from the client device 106.

The process 600 accesses the intent flag associated with the one of the plurality of clusters to determine whether the search query is included in the high local intent cluster or the low local intent cluster (604). For example, FIG. 1A illustrates the digital component distribution system 110 accessing, over the network 102, information identifying intent flags indicating the high local intent query clusters and/or queries stored in the high local intent index 152, and information identifying intent flags indicating the low local intent query clusters and/or queries stored in the low local intent index 154.

If the process 600 determines that the search query is included in a high local intent query cluster, the process 600 modifies a content item distributed to the client device in response to the search query, including adding a local content feature to the content item (606). For example, FIG. 3B illustrates high local intent query results, such as displaying search results output elements 324A-324N and digital component results 118A-118N with the respective associated local content features 119A-119N.

If the process 600 determines that the search query is included in a low local intent query cluster, the process 600 distributes the content item distributed to the client device in response to the search query without adding the local content feature (608). For example, FIG. 3A illustrates low local intent query results, such as displaying search results output elements 314A-314N and digital component results 118A-118N without local content features.

In some situations, the digital component distribution system 110 can access and search multiple different query clusters. In these situations, the process of determining whether the search query is included in the high local intent cluster or the low local intent cluster may include searching multiple different query clusters using the search query, determining whether a given query cluster that is determined to include the search query based on the search has been assigned a value to the intent flag indicating as a high local intent cluster or a low local intent cluster, and assigning to the intent flag a value indicating the search query is a high local intent query or a low local intent query based on the determined assigned value to the intent flag of the given query cluster that includes the search query. For example, the digital component distribution system 110 receives a search query request 112, accesses the cluster index 136 to determine which query cluster the search query is grouped within, and accesses the local intent index 150 to determine whether the assigned value to the intent flag indicates the search query as a high local intent query or a low local intent query for the particular query cluster.

In some situations, the digital component distribution system 110 can identify local intent flags for the given query in a search query database. In these situations, the process of determining whether the search query is included in the high local intent cluster or the low local intent cluster may include identifying the search query in a database of search queries, determining whether a high local intent flag or a low local intent flag has been set for the search query in the database, and assigning a value to the local intent flag indicating that the search query as a high local intent query or a low local intent query based on the determination of whether the high local intent flag or the low local intent flag has been set for the search query in the database. For example, the digital component distribution system 110 receives a search query request 112, accesses a database of search queries that includes local intent flags for each query (e.g., query data store 162) to determine which local intent flag is set for the given query, and assigns a value to the local intent flag indicating that the given query is high local intent or low local intent corresponding to the local intent flag.

In some implementations, the added local content feature of the modified content item includes one or more interactive user interface objects, and the method further includes receiving information specifying an interaction with one of the one or more interactive user interface objects, and providing data that causes additional content to be presented, the additional content being selected based on the interaction. For example, FIG. 4B illustrates three interactive user interface objects, 412, 414, and 416. If a user selects one of the interactive user interface objects, the client device can either initiate a corresponding application on the client device 106, or present a web browser application that directs the user to a corresponding website for the respective selected interactive user interface object 412, 414, or 416.

In some implementations, the system can generate the high and low local intent labels for a particular query by processing the query using a location intent model. For example, the location intent model may be a location intent neural network system which includes a location intent detection neural network. In this example, the location intent detection neural network may be configured to process a query to generate query data that includes data defining portions of the query that may reflect a location intent construed from the text of the query. For example, the search system could sample a lot queries (e.g., millions), and performing large scale human evaluation to label the local intent on these queries, and build a machine learning model to predict this label, i.e., the likelihood a query has location intent.

In some implementations, determining local intent of a query is based on the local intent classification of a keyword that triggers distribution of the digital component. For example, keywords specified by a content provider can be classified as having high local intent or low local intent using techniques similar to those discussed herein. When the keyword that triggers distribution of the digital component (e.g., is matched by the search query) has high local intent, the local extension of the digital component can be triggered, and when the keyword that triggers distribution of the digital component has low local intent, the local extension is not triggered.

Figure 7:
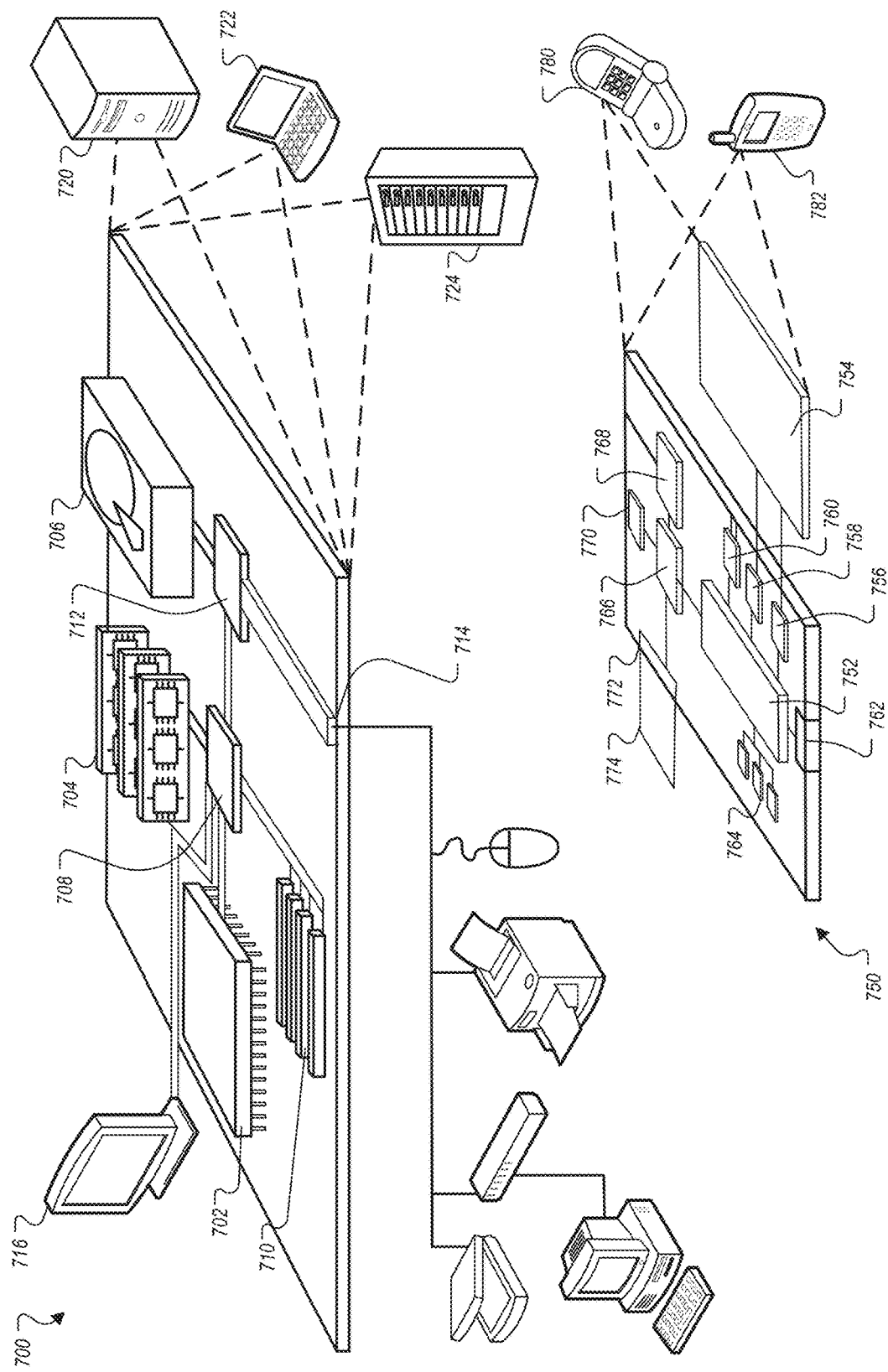
FIG. 7 is a block diagram of an example computer system that can be used to implement the methods, systems and processes described in this disclosure.

FIG. 7 is a block diagram of example computing devices 700, 750 that can be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 700 is further intended to represent any other typically non-mobile devices, such as televisions or other electronic devices with one or more processors embedded therein or attached thereto. Computing device 750 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed controller 708 connecting to memory 704 and high-speed expansion ports 710, and a low-speed controller 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed controller 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of duties is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed bus 714. The low-speed bus 714 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as computing device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The computing device 750 may also be provided with a storage device, such as a micro-drive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the computing device 750, such as control of user interfaces, applications run by computing device 750, and wireless communication by computing device 750.

Processor 752 may communicate with a user through control interface 758 and display interface 756 coupled to a display 754. The display 754 may be, for example, a TFT LCD display or an OLED display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of computing device 750 with other devices. External interface 762 may provide, for example, for wired communication (e.g., via a docking procedure) or for wireless communication (e.g., via Bluetooth® or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to computing device 750 through expansion interface 772, which may include, for example, a subscriber identification module (SIM) card interface. Such expansion memory 774 may provide extra storage space for computing device 750, or may also store applications or other information for computing device 750. Specifically, expansion memory 774 may include instructions to carry out or supplement the processes described above, and may include secure information also. Thus, for example, expansion memory 774 may be provide as a security module for computing device 750, and may be programmed with instructions that permit secure use of computing device 750. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768 (e.g., a radio-frequency transceiver). In addition, short-range communication may occur, such as using a Bluetooth®, WiFi, or other such transceiver (not shown). In addition, GPS receiver module 770 may provide additional wireless data to computing device 750, which may be used as appropriate by applications running on computing device 750.

Computing device 750 may also communicate audibly using audio codec 760, which may receive spoken information from a user and convert it to usable digital information. Audio codec 760 may likewise generate audible sound for a user, such as through a speaker, e.g., in a handset of computing device 750. Such sound may include sound from voice telephone calls, may include recorded sound (e.g., voice messages, music files, etc.) and may also include sound generated by applications operating on computing device 750.

The computing device 750 may be implemented in a number of different forms, as shown in the figure. For example, it may be implemented as a cellular telephone 780. It may also be implemented as part of a smartphone 782, personal digital assistant, or other mobile device.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
obtaining, by one or more computers, cluster data including a plurality of query clusters, wherein each query cluster is a set of multiple different search queries that have been included in a same query cluster based on one or more matching query features;
for each given query cluster from among the plurality of query clusters, maintaining, in a memory accessible to the one or more computers, an intent flag for the given query cluster based on a determination of whether a subset of the multiple different search queries within the given query cluster that trigger a local search feature meets a local intent threshold amount of queries;
receiving, by the one or more computers, a search query submitted by a client device and an indication of one of the plurality of query clusters in which the search query is included;
accessing, by the one or more computers, the intent flag associated with the one of the plurality of query clusters to determine whether the search query is included in a high local intent cluster or a low local intent cluster; and
responding to the search query, including:
adding, by the one or more computers, a local content feature to a content item when the search query is determined to be included in the high local intent cluster; and
distributing, by the one or more computers, the content item to the client device in response to the search query without adding the local content feature when the search query is determined to be included in the low local intent cluster.

2. The method of claim 1, further comprising determining a subset of the multiple different search queries within the given query cluster that trigger a local search feature when input to a search system.

3. The method of claim 2, further comprising:
for each given search query within the given query cluster:
determining whether the given search query triggers presentation of a local knowledge panel in a search results page generated by the search system using the given search query;
determining a total number of the given search queries that trigger presentation of the local knowledge panel;
determining a portion of the search queries based on a ratio of the total number of the given search queries that trigger presentation of the local knowledge panel relative to how many search queries are in the given query cluster; and
determining whether the given query cluster meets the local intent threshold based on the portion of the search queries.

4. The method of claim 1, further comprising:
for each given search query within the given query cluster:
determining whether the given search query includes local attributes that triggers presentation of one or more local elements in a search results page generated by a search system using the given search query;
determining a total number of the given search queries that trigger presentation of one or more local elements;
determining a ratio of the total number of the given search queries that trigger presentation of one or more local elements relative to how many search queries are in the given query cluster; and
determining whether the given query cluster meets the local intent threshold based on the ratio.

5. The method of claim 1, further comprising:
searching multiple different query clusters using the search query;
determining whether a given query cluster that is determined to include the search query based on the searching has been assigned a value to the intent flag indicating as a high local intent cluster or a low local intent cluster; and
assigning, to a search query intent flag, a value indicating that the search query is a high local intent query or a low local intent query based on the determined assigned value to the intent flag of the given query cluster that includes the search query.

6. The method of claim 1, further comprising:
identifying the search query in a database of search queries;
determining whether a high local intent flag or a low local intent flag has been set for the search query in the database; and
assigning to the intent flag a value indicating that the search query is a high local intent query or a low local intent query based on the determination of whether the high local intent flag or the low local intent flag has been set for the search query in the database.

7. The method of claim 1, wherein the added local content feature of the content item comprises an interactive user interface object, the method further comprising:
receiving information specifying an interaction with the interactive user interface object; and
providing data that causes additional content to be presented, the additional content being selected based on the interaction.

8. A system, comprising:
a data processing apparatus; and
a non-transitory computer readable storage medium in data communication with the data processing apparatus and storing instructions executable by the data processing apparatus and upon such execution cause the data processing apparatus to perform operations comprising:
obtaining cluster data including a plurality of query clusters, wherein each query cluster is a set of multiple different search queries that have been included in a same query cluster based on one or more matching query features;
for each given query cluster from among the plurality of query clusters, maintaining, in a memory accessible to the data processing apparatus, an intent flag for the given query cluster based on a determination of whether a subset of the multiple different search queries within the given query cluster that trigger a local search feature meets a local intent threshold amount of queries;
receiving a search query submitted by a client device and an indication of one of the plurality of query clusters in which the search query is included;
accessing the intent flag associated with the one of the plurality of query clusters to determine whether the search query is included in a high local intent cluster or a low local intent cluster; and
responding to the search query, including:
adding a local content feature to a content item when the search query is determined to be included in the high local intent cluster; and
distributing the content item to the client device in response to the search query without adding the local content feature when the search query is determined to be included in the low local intent cluster.

9. The system of claim 8, wherein the instructions cause the data processing apparatus to perform operations further comprising determining a subset of the multiple different search queries within the given query cluster that trigger a local search feature when input to a search system.

10. The system of claim 9, wherein the instructions cause the data processing apparatus to perform operations further comprising:
for each given search query within the given query cluster,
determining whether the given search query triggers presentation of a local knowledge panel in a search results page generated by the search system using the given search query;
determining a total number of the given search queries that trigger presentation of the local knowledge panel; and
determining a portion of the search queries based on a ratio of the total number of the given search queries that trigger presentation of the local knowledge panel relative to how many search queries are in the given query cluster.

11. The system of claim 9, wherein the instructions cause the data processing apparatus to perform operations comprising:
for each given search query within the given query cluster:

determining whether the given search query includes local attributes that triggers presentation of one or more local elements in a search results page generated by the search system using the given search query;

determining a total number of the given search queries that trigger presentation of one or more local elements;

determining a ratio of the total number of the given search queries that trigger presentation of one or more local elements relative to how many search queries are in the given query cluster; and determining whether the given query cluster meets the local intent threshold based on the ratio.

12. The system of claim 8, wherein the instructions cause the data processing apparatus to perform operations further comprising:

searching multiple different query clusters using the search query;

determining whether a given query cluster that is determined to include the search query based on the searching has been assigned a value to the intent flag indicating as a high local intent cluster or a low local intent cluster; and assigning to a search query intent flag a value indicating that the search query is a high local intent query or a low local intent query based on the determined assigned value to the intent flag of the given query cluster that includes the search query.

13. The system of claim 8, wherein the instructions cause the data processing apparatus to perform operations further comprising:

identifying the search query in a database of search queries;

determining whether a high local intent flag or a low local intent flag has been set for the search query in the database; and assigning to the intent flag a value indicating that the search query is a high local intent query or a low local intent query based on the determination of whether the high local intent flag or the low local intent flag has been set for the search query in the database.

14. The system of claim 8, wherein:

the added local content feature of the content item comprises an interactive user interface object;

the instructions cause the data processing apparatus to perform operations comprising:

receiving information specifying an interaction with the interactive user interface object; and providing data that cause additional content to be presented, the additional content being selected based on the interaction.

15. A non-transitory computer storage medium encoded with a computer program, the computer program comprising instructions that when executed by a data processing apparatus cause the data processing apparatus to perform operations comprising:

obtaining cluster data including a plurality of query clusters, wherein each query cluster is a set of multiple different search queries that have been included in a same query cluster based on one or more matching query features;

for each given query cluster from among the plurality of query clusters, maintaining, in a memory accessible to the data processing apparatus, an intent flag for the given query cluster based on a determination of whether a subset of the multiple different search queries within the given query cluster that trigger a local search feature meets a local intent threshold amount of queries;

receiving a search query submitted by a client device and an indication of one of the plurality of query clusters in which the search query is included;

accessing the intent flag associated with the one of the plurality of query clusters to determine whether the search query is included in a high local intent cluster or a low local intent cluster; and responding to the search query, including:

adding a local content feature to a content item when the search query is determined to be included in the high local intent cluster; and distributing the content item to the client device in response to the search query without adding the local content feature when the search query is determined to be included in the low local intent cluster.

16. The non-transitory computer storage medium of claim 15, wherein the instructions cause the data processing apparatus to perform operations further comprising determining a subset of the multiple different search queries within the given query cluster that trigger a local search feature when input to a search system.

17. The non-transitory computer storage medium of claim 16, wherein the instructions cause the data processing apparatus to perform operations further comprising:

for each given search query within the given query cluster, determining whether the given search query triggers presentation of a local knowledge panel in a search results page generated by the search system using the given search query;

determining a total number of the given search queries that trigger presentation of the local knowledge panel;

determining a portion of the search queries based on a ratio of the total number of the given search queries that trigger presentation of the local knowledge panel relative to how many search queries are in the given query cluster; and determining whether the given query cluster meets the local intent threshold based on the portion of the search queries.

18. The non-transitory computer storage medium of claim 16, wherein the instructions cause the data processing apparatus to perform operations further comprising:

for each given search query within the given query cluster:

determining whether the given search query includes local attributes that triggers presentation of one or more local elements in a search results page generated by the search system using the given search query;

determining a total number of the given search queries that trigger presentation of one or more local elements;

determining a ratio of the total number of the given search queries that trigger presentation of one or more local elements relative to how many search queries are in the given query cluster; and determining whether the given query cluster meets the local intent threshold based on the ratio.

19. The non-transitory computer storage medium of claim 15, wherein the instructions cause the data processing apparatus to perform operations further comprising:

searching multiple different query clusters using the search query;

determining whether a given query cluster that is determined to include the search query based on the searching has been assigned a value to the intent flag indicating as a high local intent cluster or a low local intent cluster; and assigning to a search query intent flag a value indicating that the search query is a high local intent query or a low local intent query based on the determined assigned value to the intent flag of the given query cluster that includes the search query.

20. The non-transitory computer storage medium of claim 15, wherein the instructions cause the data processing apparatus to perform operations further comprising:

identifying the search query in a database of search queries; determining whether a high local intent flag or a low local intent flag has been set for the search query in the database; and assigning to the intent flag a value indicating that the search query is a high local intent query or a low local intent query based on the determination of whether the high local intent flag or the low local intent flag has been set for the search query in the database.

* * * * *